United States Patent
Chase et al.

(10) Patent No.: US 10,138,945 B2
(45) Date of Patent: Nov. 27, 2018

(54) FLEXIBLE COUPLING

(71) Applicants: Ian Thomas Chase, Banbury (GB); Aniel Tom Ganatra, Birmingham (GB)

(72) Inventors: Ian Thomas Chase, Banbury (GB); Aniel Tom Ganatra, Birmingham (GB)

(73) Assignee: CROMPTON TECHNOLOGY GROUP LIMITED, Solihull, West Midlands (GB)

( * ) Notice: Subject to any disclaimer, the term of this patent is extended or adjusted under 35 U.S.C. 154(b) by 0 days.

(21) Appl. No.: 14/815,462

(22) Filed: Jul. 31, 2015

(65) Prior Publication Data
US 2016/0061273 A1    Mar. 3, 2016

(30) Foreign Application Priority Data
Aug. 20, 2014  (GB) .................................. 1414801.9

(51) Int. Cl.
*F16D 3/78*    (2006.01)
*F16B 37/14*   (2006.01)

(52) U.S. Cl.
CPC ................ *F16D 3/78* (2013.01); *F16B 37/14* (2013.01); *Y10T 29/49844* (2015.01)

(58) Field of Classification Search
CPC ....... F16B 37/14; F16D 3/78; Y10T 29/49844
USPC ................. 464/93–96, 98, 99, 138; 411/431; 29/436
See application file for complete search history.

(56) References Cited

U.S. PATENT DOCUMENTS

| | | | |
|---|---|---|---|
| 1,460,594 A * | 7/1923 | Le Moon | F16D 3/78 464/95 |
| 2,639,595 A * | 5/1953 | Werner | F16D 3/79 464/99 X |
| 3,543,538 A | 12/1970 | Farrell | |
| 3,684,999 A * | 8/1972 | LaFramboise | H01R 4/64 464/94 X |
| 3,703,817 A * | 11/1972 | Orwin | F16D 3/79 464/99 |
| 4,473,332 A * | 9/1984 | Sturdy | F16B 33/002 |
| 4,502,256 A * | 3/1985 | Hahn | E04D 5/143 411/431 X |

(Continued)

FOREIGN PATENT DOCUMENTS

| | | |
|---|---|---|
| DE | 700 247 | * 12/1940 |
| DE | 102014000783 A1 | 7/2015 |
| FR | 2904070 A1 | 1/2008 |

(Continued)

OTHER PUBLICATIONS

Great Britian Search Report for application No. GB1414801.9; dated Feb. 24, 2015, 3 pages.

*Primary Examiner* — Greg Binda
(74) *Attorney, Agent, or Firm* — Cantor Colburn LLP

(57) ABSTRACT

A flexible coupling includes a flexible torque disc comprising a plurality of mount points and a first coupling member mounted to a first subset of said mount points. The coupling also includes one or more second coupling members each mounted to a second subset of said mount points. The first coupling member comprises one or more flanges substantially parallel with said torque disc and the one or more second coupling members each has a groove engaging with said one or more flanges so as to limit the displacement of said first coupling member with respect to said second coupling member.

7 Claims, 2 Drawing Sheets

(56) References Cited

U.S. PATENT DOCUMENTS 6,200,223 B1   3/2001  Martens
7,878,913 B2 * 2/2011  Bouzit ..................... F16D 3/78
                                                    464/93

FOREIGN PATENT DOCUMENTS

GB       815207 A     6/1959
GB      2504064 A     1/2014
WO   2015107321 A1    7/2015

* cited by examiner ns FLEXIBLE COUPLING

FOREIGN PRIORITY

This application claims priority to Great Britain Patent Application No. 1414801.9 filed Aug. 20, 2014, the entire contents of which is incorporated herein by reference.

TECHNICAL FIELD

This disclosure relates to a flexible coupling, in particular to a flexible coupling for joining two shafts and transmitting torque there between.

BACKGROUND

Flexible couplings are used for example in drive trains where a certain amount of flex needs to be accommodated. For example in the drive trains for flaps and slats on aircraft wings, a certain amount of flex in the wings needs to be accommodated.

One type of flexible coupling that has been extensively used is a barreled spline joint. The barreling on this joint allows angular movement of one shaft with respect to the other. However, excessive angular deviation can lead to compromise of the environmental seal of the joint. In tests on one barreled spline joint a torque of less than 50 Nm was required before the joint reached an angle of 7 degrees at which point the seal is considered compromised. At a bending moment of less than 100 Nm, the barreled spline joint showed visible damage.

Another type of flexible coupling in regular use is the diaphragm coupling which transmits torque through a diaphragm of a different diameter to the shafts so that a certain amount of angular or axial displacement can be accommodated.

Flexible torque discs are one type of flexible coupling that can be used to connect two shafts together, transmitting torque from one shaft to the other while allowing small angular and axial displacements of one shaft relative to the other to be accommodated. Typically one shaft is fixed to one side of the torque disc and the other shaft is fixed to the opposite side of the torque disc such that movements (axial or angular) result in deformation of the torque disc.

For reduced weight, torque discs may be formed from composite materials such as carbon fibre reinforced polymer (CFRP). Such composite materials can be designed to have good torque transmission characteristics (i.e. high rigidity) in the rotation direction (i.e. circumferentially) while having a degree of compliance under bending moments (i.e. out of plane loads). WO 2013/064807 describes such a torque disc.

One problem with composite materials is that too high a bending force may cause delamination of layers within the material or may cause small stress fractures that can weaken the disc. Moreover such defects may be difficult to detect (e.g. not visible on visual inspection) and may cause an unacceptable risk of failure.

The bending force that occurs during normal use can be calculated in advance and the joint designed appropriately. However, higher bending moments can occur during installation, maintenance and repair. For example, a shaft on one side of the joint may be displaced by an engineer when effecting a repair or trying to gain access in a confined space. The bending induced by such movement may result in a higher bending moment than the joint was designed for and may result in damage as discussed above.

One way to prevent excessive bending through a coupling is to use hollow shafts for both the driving and driven shafts and to provide a pin across the coupling that passes from the inside of one shaft to the inside of the other shaft. The length and diameter of the pin relative to the internal dimensions of the shafts determines how much angular deviation can take place before the pin engages with the inside walls of the hollow shafts and prevents further bending. However the pin has to span the joint which can make assembly of the joint difficult, particularly in confined spaces.

SUMMARY

According to one aspect of this disclosure there is provided a flexible coupling comprising: a flexible torque disc comprising a plurality of mount points; a first coupling member mounted to a first subset of said mount points; one or more second coupling members each mounted to a second subset of said mount points; wherein said first coupling member comprises one or more flanges substantially parallel with said torque disc; and wherein said one or more second coupling members each has a groove engaging with said one or more flanges so as to limit the displacement of said first coupling member with respect to said second coupling member.

In use the first coupling member may be attached to or integrally formed with a rotatable member such as a first shaft. The second coupling members are preferably attachable to a second rotatable member such as a second shaft. The interaction between the flange and the groove(s) serves to restrict angular deflection of the first rotatable member with respect to the second rotatable member. The flange and the groove do not need to be in contact with one another. In fact, in normal operation they will not be in contact. However, they cooperate so as to prevent one rotatable member from bending off-axis to a degree that would risk damage to the torque disc. As the groove essentially surrounds or encompasses the flange, movement of the flange (either due to axial movement of the first coupling member or due to off-axis deflection of the first coupling member or a shaft attached thereto) causes the flange to come into contact with one or other side of the groove, restricting further movement and thus restricting the bending moment applied to the torque disc.

Particularly advantageously, the flange(s) are integrally formed with the first coupling member which is directly fixed to the torque disc. This reduces the number of parts that need to be manufactured and reduces the number of parts that need to be aligned and assembled together when connecting the joint.

The flange(s) preferably extend partially around the second coupling member(s). For example where the second coupling members are generally circular (in cross section in the plane of the torque disc), the flange extends in an arc around the second coupling member within the groove. The flange preferably then overlaps in the radial direction with the second coupling member so that if the disc fails for any reason, rotational movement can still be transmitted through the coupling by transmitting torque directly through the interface between first and second coupling members (i.e. by the flange pressing on and driving the second coupling member or vice versa). With the flange overlapping radially with the second coupling member on both sides of the coupling member, torque can be transmitted in this manner in either rotation direction. Thus preferably the or each flange has a concave arc shape that mates or engages with the groove around the second coupling member. The concave flange may face radially outwards, i.e. the first coupling member presenting its flange(s) in the radially outward direction. The arc may be a full semicircle in extent or it may be less than a semicircle.

The flange may be thinner than the rest of the first coupling member. As the flange must fit inside the groove, a thinner flange allows a thinner groove which in turn allows a lower profile second coupling member to be used, thus saving weight.

The relative dimensions of the flange and the groove will affect the amount of movement (translational or bending) that can be accommodated before contact occurs and further movement is restricted.

In some preferred examples, the coupling permits at least 0.5 degrees of angular movement, more preferably at least 1 degree of angular movement. The coupling may restrict the angular movement to be not more than 5 degrees, more preferably not more than 3 degrees.

In some examples, the coupling permits at least 1 mm of axial movement, more preferably at least 2 mm of axial movement. The coupling may restrict axial movement to be not more than 4 mm of axial movement, more preferably not more than 3 mm.

The above ranges of angular and axial movement may apply in certain examples for use in aircraft drive systems for slats and flaps on aircraft wings. They may also apply to numerous other drive trains such as the drive trains of motor vehicles. In larger implementations e.g. for large generators or wind turbines, the axial and/or angular movement ranges permitted by the coupling may be significantly greater.

Preferably a plurality of second coupling members are provided. In some examples two, three or more than three second coupling members may be provided.

The or each second coupling member may comprise a hollow shaft that extends through its mount point in the torque disc. The hollow shaft permits a fixing member to be passed there through for affixing a second rotatable member to the opposite side of the torque disc from the first coupling member (and first rotatable member). The or each second coupling member may be secured to the torque disc by an interference fit in said mount point, optionally with additional adhesive to bond the second coupling member to the torque disc. It is desirable for the first coupling member and the second coupling member(s) to be permanently affixed to the torque disc so that a maintenance or repair engineer cannot later make any attempt to undo or remove them. As the movement restrictions of the joint are defined by the relationship between these components, when they are all permanently fixed in place that relationship is fixed and cannot accidentally be altered which might compromise the joint and the machinery in which it is installed.

Preferably the or each second coupling member has a captive nut removably held therein for removable attachment to a rotatable member. The second coupling member is to be attached in use to a second rotatable element that is on the opposite side of the torque disc from a first rotatable element. The captive nut may be removably held within a parallel sided slot in the second coupling member. The slot opening may face radially outwardly towards the edge of the torque disc so that the nut may be easily inserted or removed from side access. The nut may align with the hollow shaft so that it can receive a fixing means passed through the shaft from the opposite side of the torque disc.

The or each second coupling member may further comprise a second groove and a retaining clip removably mounted in the second groove and which holds the captive nut in place. To facilitate installation, maintenance and repair, particularly in restricted spaces, the nut is preferably held in alignment with the hollow shaft by the clip so that the engineer does not risk losing the bolt while trying to assemble or disassemble the joint. With the captive nuts held in place, the fixing means (e.g. bolts) that hold the second rotatable member onto the second coupling members can be removed while leaving the nut in place. The captive nuts do need to be replaced periodically and so it is preferred that they are not permanently affixed to the second coupling members. The retaining clip may be sprung so that it can be removed from its groove by resiliently deforming it to increase its radius. By removing the clip, the captive nut can be removed from the slot in the coupling member and replaced. The retaining clip is then remounted in the groove to hold the new nut in place for re-assembly.

The retaining clip may comprise a projection that extends across an opening of the slot in which the captive nut is positioned to obstruct removal of said captive nut from said slot. Because the second coupling member has a groove for engagement with a flange of the first coupling member, the location of the groove for the retaining clip is restricted. For optimum positioning of the main groove, the groove for the retaining clip may be positioned further from the torque disc. This may place the retaining clip above the height of an average sized nut. Rather than increase the size of nut (which would add more weight), the retaining clip with a projection can block the slot opening and hold the nut captive within its slot.

The or each retaining clip may fully encircle its respective second coupling member and may cross over itself, each end of the clip comprising a projection that extends across the opening. The projections together may act as handles to aid removal of the retaining clip from its groove. The fact that the clip crosses over itself means that the clip may be removed by squeezing the projections together. This is in contrast to most circlips which are removed using special circlip pliers. The circlip pliers are used to expand the circlip by bending it to increase its radius. However the degree of force applied to the circlip is up to the user and too much force can often be applied, permanently deforming or breaking the circlip. With the crossed formation described above, the amount of deformation applied to the circlip is limited by the distance between the projections. This can be designed in advance so that it is sufficient to remove the clip, but not so much that permanent deformation occurs. Thus damage to the clip is prevented. Many circlips are also thickened in the area that experiences most stress under deformation so as to mitigate the risk of damage. The crossed formation described above leads to a predictable maximum force which does not require additional thickening of the clip.

The torque disc may be made from any suitable material and the material can be selected depending on the intended use. However, in many preferred examples, the torque disc is made from a composite material such as carbon fibre reinforced polymer (CFRP) as this has a very good circumferential strength for transmission of torque, but is also adequately compliant to allow a certain bending moment across it.

Different sizes of torque disc may be used in different applications. In some examples, e.g. for use in aircraft for operating flaps and slats or in the drive trains of motor vehicles (including cars, trains and boats), the torque disc may be up to about 10 cm in diameter. In other examples, e.g. for wind turbines or other large generators, the torque disc may be significantly larger, e.g. greater than about 50 cm or greater than 1 meter in diameter.

According to other aspects of this disclosure there is provided an aircraft, a land or sea based motor vehicle or a wind turbine comprising a torque disc as described above, optionally including any or all of the optional features also described above.

According to another aspect of this disclosure there is provided a method of assembling a flexible coupling comprising: attaching a first coupling member to a first set of mount points on a flexible torque disc; attaching one or more second coupling members to a second set of mount points on said flexible torque disc; and positioning one or more flanges on said first coupling member in a groove on the or each second coupling member such that displacement of said first coupling member is limited with respect to the or each second coupling member.

The second coupling members may be installed first with the first coupling member then positioned with its flange(s) in the grooves before being fixed in place. However, especially where the flanges have a significant extent (and thus a significant overlap with the second coupling members, and particularly when two or more second coupling members are used, it will be difficult to locate the flanges in the respective grooves once the second coupling members have been installed. Therefore the step of positioning flanges in grooves may be conducted before the steps of attaching first and second coupling members. Thus all of the first and second coupling members are positioned in the appropriate configuration before all of them are mounted to the torque disc. The step of attaching the first coupling member may be carried out simultaneously with the step of attaching the second coupling member(s), i.e. all of the coupling members may be simultaneously inserted into the mount points on the torque disc and affixed thereto while maintaining their configuration with the flanges in their respective grooves. This mounting technique allows the flanges to be made integrally on a single first mounting member that is also fixed to the torque disc. The reduction in components made possible by this arrangement reduces size and weight as well as reducing the manufacturing cost by reducing the number of components that need to be made.

BRIEF DESCRIPTION OF DRAWINGS

One or more non-limiting examples will now be described, by way of example only, and with reference to the accompanying figures in which.

DETAILED DESCRIPTION OF THE INVENTION

Figure 1:
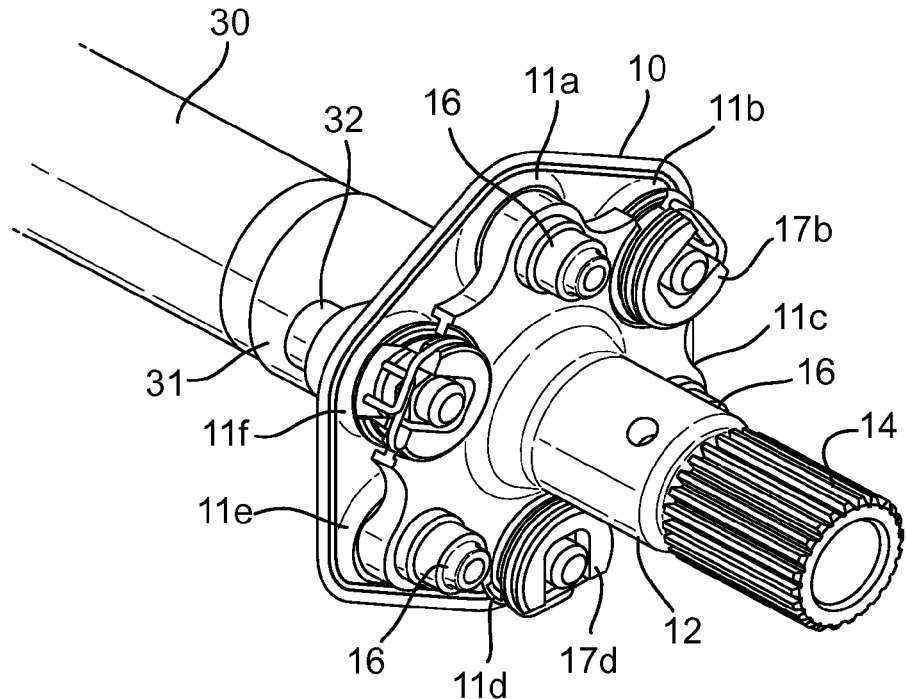
FIG. 1 shows an assembled joint.

FIG. 1 shows a carbon fibre reinforced polymer torque disc 10 (although it should be noted that other materials may be used). The torque disc 10 has a generally hexagonal shape and has six mount points 11a-f in the vicinity of its vertices. The torque disc 10 is slightly thicker in the region of each mount point 11a-f due to the particular construction of this disc which provides additional strength around the mount points which are otherwise weaker points of the structure. However it should be noted that this thickening is not a limiting feature and may not be required on other torque discs.

Figure 2:
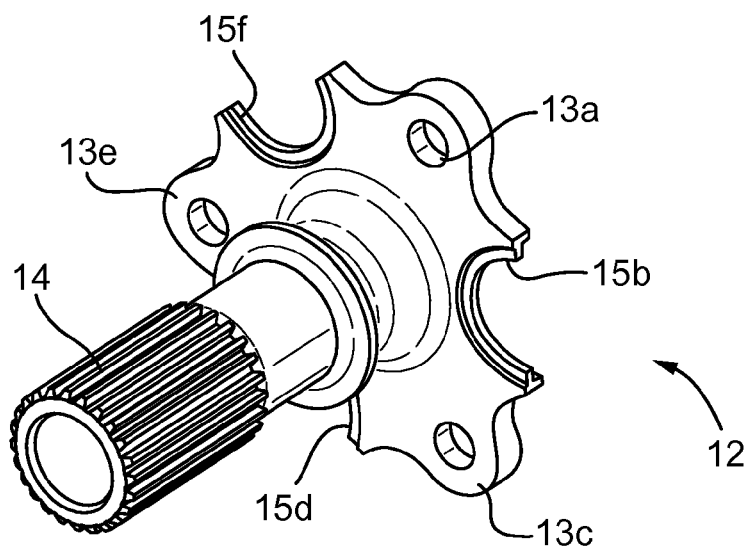
FIG. 2 shows a first coupling member in isolation.

A first coupling member 12 is mounted to one side of the torque disc 10 via three of the mount points 11a, 11c, 11e. The first coupling member 12 is shown in more detail in FIG. 2. The first coupling member 12 has a tripod shape with its three fixing points 13a, 13c, 13e disposed symmetrically around the axis of rotation. A crown spline 14 is formed on the other end of first coupling member 12 for attachment to a drive shaft in use. Interleaved between the three fixing points 13a, 13c, 13e are three flanges 15b, 15d, 15f. Each flange 15b, 15d, 15f is in the form of an arc, being a concave opening in the first coupling member 12. In this example, each flange 15b, 15d, 15f is a semicircle, but shorter arc lengths may be used in other examples. As shown in FIG. 1, each fixing point 13a, 13c, 13e is fixed to a mount point 11a, 11c, 11e on the torque disc 10 by a shear bolt 16. Shear bolts 16 are threaded fasteners where the tightening mechanism (e.g. hexagonal head) shears off when the fastener is tightened to the desired torque. Subsequent removal of these fasteners is difficult as there is no drive means by which to loosen the fastener. Shear bolts 16 are used so as to avoid any risk of the first coupling member 12 being removed from the torque disc during subsequent maintenance operations, thus avoiding any risk of the angle limiting feature being disturbed or altered such that damage to the torque disc 10 might occur.

FIG. 1 also shows that each flange 15b, 15d, 15f engages with and partially surrounds a second coupling member 17b, 17d, 17f. A single second coupling member 17 is shown in more detail in FIG. 3. The second coupling member 17 has a generally cylindrical head part 18 and a cylindrical shaft 19 extending therefrom. The cylindrical shaft 19 is hollow, having a central bore through which a fastener may be inserted for mounting as described further below. The cylindrical shaft 19 is mounted to a mount point 11b, 11d, 11f of the torque disc 10 using an interference fit with additional adhesive to ensure that it remains firmly mounted to the disc 10.

The head part 18 of second coupling member 17 has a circumferential groove 20 around its perimeter which is designed to engage with the flanges 15b, 15d, 15f of the first coupling member 12. This interaction will be described in more detail with reference to FIG. 4 below.

Head part 18 also has a slot 21 open to one side so as to permit insertion and removal of a captive nut 22. Slot 21 has a wider part at the bottom to receive a lower flange 23 of nut 22. The upper part of slot 21 has a width matching the size of the hexagonal head 24 of nut 22, i.e. with a width just larger than the distance between opposite faces of the hexagonal head. The slot 21 thus holds nut 22 captive such that it cannot rotate relative to coupling member 17 when mounted in the slot 21.

To prevent nut 22 from sliding back out of slot 21 (e.g. under gravity during installation or maintenance), nut 22 is held in place by retaining clip 25. Retaining clip 25 fully encircles head part 18 and is seated in a second groove 26 in head part 25 located above the main angle limiting groove 20 (i.e. further from the torque disc 10). As the second groove 26 is spaced relatively far from torque disc 10 while nut 22 is relatively close to torque disc 10, retaining clip 25 is provided with two projections 27, one at each end of the clip 25. Each projection 27 is formed simply be bending retaining clip 25 at approximately 90 degrees to the rest of clip 25 such that the clip 25 can advantageously be made from a suitably sized and sprung piece of wire. Projections 27 each extend across slot 21 so as to prevent nut 22 from sliding out of slot 21. Projections 27 extend sufficiently far that they engage with the flange 23 of nut 22 rather than with the hexagonal head 24. The flange 23 is circular and therefore the engagement of projections 27 and flange 23 defines a stable position of nut 22 regardless of the relative positions of nut 22 and retaining clip 25. If the projections 27 merely engaged with the head 24 of nut 22, the nut would be retained, but slight variations in position would affect the point of engagement between the projections 27 and the faces of head 24 resulting in a slight play of nut 22 within groove 21 and thus a potential slight and inconvenient misalignment between the thread of nut 22 and the bore of cylindrical part 19.

Figure 3:
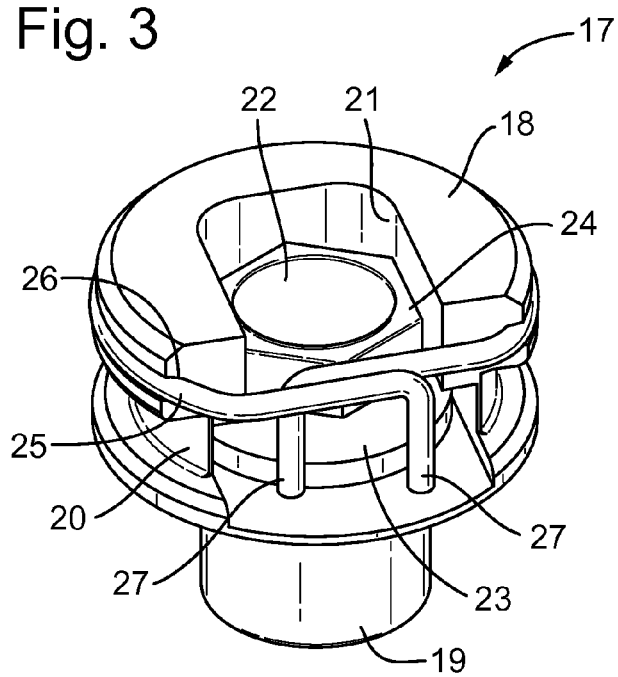
FIG. 3 shows a second coupling member in isolation.

Retaining clip 25 has a D shape with a flat edge on which the projections 27 are formed. This D shape ensures approximate alignment of the projections 27 with the slot 21 so that they cannot twist out of position in use. As shown in FIG. 3, the retaining clip 25 is wound more than a complete turn around the part 18 such that it crosses over itself. With this arrangement, projections 27 can be used as handles and squeezed together in order to expand the diameter of retaining clip 25 so that it can be easily removed from its groove 26. The distance between projections 27 (i.e. the overlap distance) can be selected so as to ensure that the clip 25 can be removed, but also so that it is not expanded so much during removal that permanent deformation occurs which could destroy the clip 25. No additional tools (such as circlip pliers) are required as the projections 27 can be readily squeezed either by fingers or with ordinary pliers.

As can be seen in FIG. 1, when mounted to torque disc 10, each second coupling member 17b, 17d, 17f is arranged with its slot 21 facing radially outwards, i.e. towards the perimeter of torque disc 10 so as to provide best access to the captive nuts 22 and retaining clips 25 for installation, maintenance and repair.

To complete the joint, as shown in FIG. 1 a shaft 30 is connected to an intermediate connector 31 which is in turn attached to each of the three second coupling members 17b, 17d, 17f by bolts 32 inserted through the central bore of each cylindrical shaft 19 and screwed into captive nut 22 until a sufficiently tight and rigid connection has been made. The joint can be separated by reversing this process to remove the bolts 32 from nuts 22. The intermediate connector 31 is another tripod shaped member with three arms arranged for connection to the second coupling members 17b, 17d, 17f and with a crown spline for attachment to a shaft. It will be appreciated that instead of using an intermediate connector 31, the tripod could be formed integrally on the end of shaft 30. Similarly, the first coupling member 12 may be formed integrally on the end of a shaft (not shown), thus avoiding the need for the crown spline connection 14.

Figure 4:
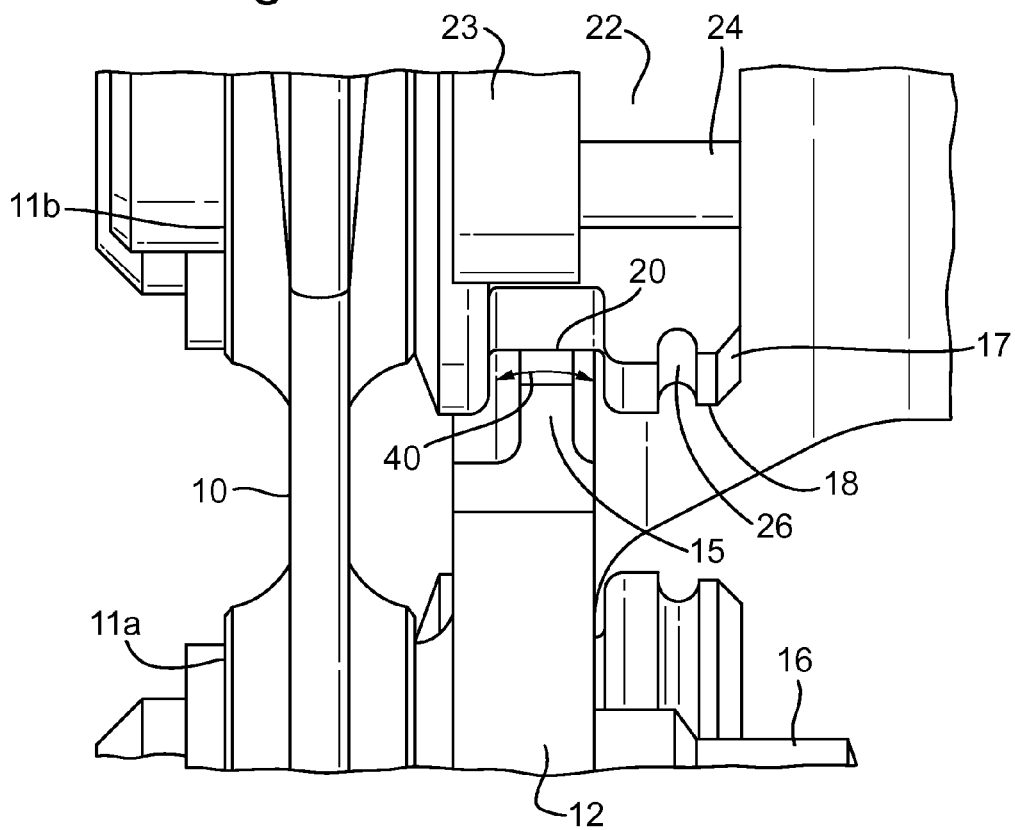
FIG. 4 shows a partial cross section illustrating operation of the joint.

FIG. 4 shows an enlarged and partially cross-sectioned view of the interaction between a flange 15 on the first coupling member 12 and a groove 20 in a second coupling member 17. Flange 15 is thinner than groove 20 (in the dimension perpendicular to the plane of the torque disc 10) and in normal use (as shown in FIG. 4) it does not come into contact with the walls of groove 20, but rather sits in spaced relationship with it. In normal use, torque applied to one shaft is transmitted from first coupling member to second coupling members (or vice versa) via torque disc 10 and thereby to the opposite shaft (e.g. from crown spline 14 to shaft 30 in FIG. 1). Small angular deviations between the input and output shaft can be accommodated by slight bending of the torque disc 10. Similarly slight axial shifts of the input and output shafts can be accommodated by deflections in the torque disc 10. However, as the angular deviation increases, the flange 15 becomes twisted and rotated within groove 20 as shown by arrow 40 until eventually flange 15 contacts a wall of groove 20 and further movement is hindered. If further angular force is applied a small additional deflection may occur until one or more of the other flanges 15 and grooves 20 contact on their opposite walls. For example with reference to FIG. 1, flange 15b may contact groove 20b on the groove face closest to shaft 30 while the flanges 15d and 15f may contact the grooves 20d and 20f on the groove faces closest to spline 14. At this point, no further rotation may be applied without breaking or denting one of the first coupling member 12 or second coupling members 17. As these are all formed from a tough and rigid material (typically a metal), further angular deflection is essentially prevented.

Note that in the case of axial movement rather than angular movement, the same principles apply except that the flanges 15 will all contact walls of the respective grooves 20 on the same side, i.e. all the walls closest to the torque disc 10 or all the walls furthest from the torque disc 10.

As can be seen from FIG. 4, the relative dimensions of the flange 15 and the groove 20 define the limits of movement that are permitted. By making the flange 15 thicker or the groove 20 narrower, movement can be restricted more. Equally by making flange 15 thinner and/or groove 20 wider, more movement can be permitted. The ratio of permitted angular movement to permitted axial movement can also be controlled to a certain extent by adjusting the radial position at which the flange engages the groove (radially with respect to the torque disc). For example by moving this contact point radially inwards (e.g. by using a smaller arc length for flange 15), the same axial limitations (defined by the width of groove 20) will give rise to a slightly larger permitted angular deviation. By careful selection of these parameters, the permitted deflections of the input and output shafts can be chosen so as to allow the movement required for operation while preventing excessive movement that might damage the torque disc 10 and lead to drive failure.

It can be seen from FIG. 1 that an advantage of this arrangement is that the flanges 15 surround the second coupling members 17 to such an extent that even if torque disc 10 were to completely fail, rotation of one shaft (on one side of the joint) will still induce rotation of the other shaft (on the other side of the joint) through contact between the flanges 15 and the grooves 20. Torque can be transmitted in either rotational direction in this manner. Although this will induce wear and noise and inefficiencies, it can be highly beneficial to still have some drive capability in the event of a torque disc fail. For example when used in the drive trains for flaps and slats on aircraft wings, loss of the whole drive train could result in loss of control of a whole wing. In this scenario it is preferable for the drive train to continue to function (sub-optimally) to retain some control until the aircraft can land and undergo repair.

Assembly of the coupling is best accomplished by mounting the three second coupling members 17b, 17d, 17f on their respective flanges 15b, 15d, 15f and then simultaneously inserting the cylindrical shafts 19 of all of the second coupling members 17b, 17d, 17f into the mount points 11b, 11d, 11f of the torque disc 10. These may be retained simply by an interference fit or adhesive may be applied prior to the insertion for a more permanent attachment. Shear bolts 16 are then used to attach fixing points 13a, 13c, 13e of first coupling member 12 to mount points 11a, 11c, 11e of torque disc 10. The flexible joint may then be completed by attaching a shaft or another intermediate connection part onto the opposite side of the torque disc 10 by passing bolts 32 through the hollow cylindrical parts 19 of second coupling members 17b, 17d, 17f and fixing them securely in captive nuts 22.

As shown in FIG. 3, the or each second coupling member 17 may further comprise a second groove 26 and a retaining clip 25 removably mounted in the second groove 26 and which holds the captive nut 22 in place. To facilitate installation, maintenance and repair, particularly in restricted spaces, the nut 22 is preferably held in alignment with the hollow shaft 19 by the clip 25 so that the engineer does not risk losing the bolt 32 while trying to assemble or disassemble the joint. With the captive nuts 22 held in place, the fixing means (e.g. bolts) that hold the second rotatable member onto the second coupling members 17 can be removed while leaving the nut in place. The captive nuts 22 do need to be replaced periodically and so it is preferred that they are not permanently affixed to the second coupling members 17. The retaining clip 25 may be sprung so that it can be removed from its groove 26 by resiliently deforming it to increase its radius. By removing the clip 25, the captive nut 22 can be removed from the slot 21 in the coupling member 17 and replaced. The retaining clip 25 is then remounted in the groove 26 to hold the new nut 22 in place for re-assembly.

In some preferred examples, the coupling permits at least 0.5 degrees of angular movement, more preferably at least 1 degree of angular movement. The coupling may restrict the angular movement to be not more than 5 degrees, more preferably not more than 3 degrees.

According to another aspect of this disclosure there is provided a method of assembling a flexible coupling comprising: attaching a first coupling member 12 to a first set of mount points 11a, 11c, 11e on a flexible torque disc 10; attaching one or more second coupling members 17 to a second set of mount points 11b, 11d, 11f on said flexible torque disc 10; and positioning one or more flanges 15b, 15d, 15f on said first coupling member 12 in a groove 20 on the or each second coupling member 17 such that displacement of said first coupling member 12 is limited with respect to the or each second coupling member 17.

The second coupling members 17 may be installed first with the first coupling member 12 then positioned with its flange(s) 15b, 15d, 15f in the grooves before being fixed in place. However, especially where the flanges 15b, 15d, 15f have a significant extent (and thus a significant overlap with the second coupling members 17, and particularly when two or more second coupling members 17 are used, it will be difficult to locate the flanges 15b, 15d, 15f in the respective grooves 20 once the second coupling members have been installed. Therefore the step of positioning flanges in grooves may be conducted before the steps of attaching first and second coupling members. Thus, all of the first and second coupling members 12, 17 are positioned in the appropriate configuration before all of them are mounted to the torque disc 10. The step of attaching the first coupling member 12 may be carried out simultaneously with the step of attaching the second coupling member(s) 17, i.e. all of the coupling members 17 may be simultaneously inserted into the mount points 11a, 11c, 11e on the torque disc 10 and affixed thereto while maintaining their configuration with the flanges in their respective grooves. This mounting technique allows the flanges to be made integrally on a single first mounting member 12 that is also fixed to the torque disc 10. The reduction in components made possible by this arrangement reduces size and weight as well as reducing the manufacturing cost by reducing the number of components that need to be made.

The invention claimed is:

1. A flexible coupling comprising:
a flexible torque disc comprising a plurality of mount points;
a first coupling member mounted to a first subset of said mount points; and
one or more second coupling members each mounted to a second subset of said mount points;
wherein said first coupling member comprises one or more flanges substantially parallel with said torque disc;
wherein said one or more second coupling members each has a groove engaging with said one or more flanges so as to limit the displacement of said first coupling member with respect to said second coupling member; and
wherein the or each second coupling member has a captive nut removably held therein for removable attachment to a rotatable member;
wherein the or each second coupling member further comprises a second groove and a retaining clip removably mounted in said second groove and which holds said captive nut in place.

2. A flexible coupling as claimed in claim 1, wherein at least one of the flanges has a concave arc shape.

3. A flexible coupling as claimed in claim 1, wherein the or each second coupling member is secured to the torque disc by an interference fit.

4. A flexible coupling as claimed in claim 1, wherein the or each captive nut is held within a slot and said retaining clip comprises a projection that extends across an opening of said slot to obstruct removal of said captive nut from said slot.

5. A flexible coupling as claimed in claim 4, wherein the or each retaining clip fully encircles its respective second coupling member and crosses over itself, each end of the clip comprising a projection that extends across said opening, said projections together acting as handles to aid removal of said clip from said groove.

6. A flexible coupling as claimed in claim 1, wherein the torque disc is made from a composite material.

7. A flexible coupling as claimed in claim 1, wherein the flange(s) and groove(s) permit at least 0.5 degrees of angular movement not more than 5 degrees of angular movement.

* * * * *